US006614386B1

(12) United States Patent  
Moore et al.

(10) Patent No.: US 6,614,386 B1
(45) Date of Patent: Sep. 2, 2003

(54) BISTATIC RADAR SYSTEM USING TRANSMITTERS IN MID-EARTH ORBIT

(75) Inventors: Kenneth L. Moore, Rancho Palos Verdes, CA (US); Chester L. Richards, Thousand Oaks, CA (US); Pileih Chen, Huntington Beach, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/086,306

(22) Filed: Feb. 28, 2002

(51) Int. Cl.[7] .......................... G01S 13/89; G01S 13/90; G01S 13/00
(52) U.S. Cl. ............................. 342/59; 342/25; 342/82; 342/89; 342/160; 342/161; 342/190; 342/191
(58) Field of Search ............................. 342/25, 26, 27, 342/28, 59, 175, 195, 352, 353–358, 159–164, 450–453, 82–103, 176, 179, 190–194, 196, 197; 244/158 R (56) References Cited

U.S. PATENT DOCUMENTS

| | | | | |
|---|---|---|---|---|
| 4,602,257 A | * | 7/1986 | Grisham | 342/25 |
| 4,670,757 A | * | 6/1987 | Munich et al. | 342/450 |
| 4,727,373 A | * | 2/1988 | Hoover | 342/25 |
| 5,097,269 A | * | 3/1992 | Takayama et al. | 342/453 |
| 5,410,314 A | * | 4/1995 | Frush et al. | 342/59 |
| 5,469,169 A | * | 11/1995 | Frush | 342/26 |
| 5,471,211 A | * | 11/1995 | Randall et al. | 342/26 |
| 6,264,143 B1 | * | 7/2001 | Massonnet | 244/158 R |
| 6,388,606 B1 | * | 5/2002 | Keydel et al. | 342/159 |

FOREIGN PATENT DOCUMENTS

JP  11-125674 A  *  5/1999 ........... G01S/13/90

OTHER PUBLICATIONS

H.D. Griffiths et al., "Bistatic Radar Using Satellite–Borne Illuminators of Opportunity"; IEEE; no date given.*
R.A. Simpson, "Spacecraft Studies of Planetary Surfaces Using Bistatic Radar"; IEEE Transactions on Geoscience and Remote Sensing; vol. 31, No. 2; Mar. 1993; pp. 465–482.*
M. Cherniakoff et al., "Radar Sensors Based on Communication Low Earth Orbiting Satellites Mircowave Emission"; IEEE Publication No. 0–7803–6359–0/00/$10.00; copyrighted in the year 2000.*
M. Cherniakoff et al., "Bistatic Synthetic Aperture Radar with Non–Cooperative LEOS Based Transmitter"; IEEE Publication No. 0–7803–6359–0/00/$10.00; copyrighted in the year 2000.*
M. Cherniakoff et al., "Air Target Detection Via Bistatic Radar Based On LEOS Communication Signals"; IEE Proc.–Radar Sonar Navig,; vol. 149, No. 1; Feb. 2002; pp. 33–38.*

* cited by examiner

Primary Examiner—Bernarr E. Gregory
(74) Attorney, Agent, or Firm—Leonard A. Alkov; Glenn H. Lenzen, Jr.

(57) ABSTRACT

A bistatic radar system and method. In the illustrative embodiment, a receiver is positioned in a horizontal plane. A transmitter is then positioned in Middle Earth Orbit at a position that is nearly vertical to the plane of the receiver. This configuration provides significant flexibility for the radar system. As such, the radar system may engage in flight patterns, in which the transmitter and receiver have velocity vectors in opposite directions (GMTI mode), the same direction (SAR mode) and variations in between (mixed mode). Lastly, a broad beam is generated from the transmitter and illuminates an area enabling several receivers to simultaneously observe the illuminated area.

1 Claim, 5 Drawing Sheets

BISTATIC RADAR SYSTEM USING TRANSMITTERS IN MID-EARTH ORBIT

BACKGROUND OF THE INVENTION

1. Field of the Invention

This invention relates to radar systems. Specifically, the present invention relates to bistatic radar systems.

2. Description of the Related Art

In a mono-static radar system, the transmitter and the receiver are co-located. In a bistatic radar architecture, the transmitter and receiver are substantially separated. In addition, both the transmitter and the receiver may be mounted on either fixed or moving platforms. Bistatic radar is therefore distinguished from monostatic radar where the transmitter and receiver are mounted on the same platform and move together.

A characteristic feature of bistatic radar systems is that the transmitter, the receiver and the target, form an iso-range ellipsoid with the transmitter and receiver at the foci of the ellipsoid. In addition, the transmitter, the receiver and the target define the bistatic plane.

Further, the receiver, the target and the receiver's motion relative to the target instantaneously define a plane, known as the "receiver slant plane." Similarly, the transmitter the target and the transmitter's motion relative to the target also define a plane, the "transmitter slant plane", which is, in general, different from the receiver slant plane.

Any planar section through the ellipsoid is an ellipse. In particular, a plane tangent to the Earth's surface cuts the ellipsoid in such a way as to produce an ellipse. Similarly, the bistatic plane, defined by the transmitter, the receiver and the target, cuts the ellipsoid in such a way as to create an ellipse.

In conventional airborne, as well as most ground based, bistatic systems the bistatic plane is nearly parallel with, and close to, the tangent plane of the Earth's surface. In this circumstance, the ellipsoid approximately reduces to an ellipse which contains the bistatic plane and the velocity vectors of the transmitter, the receiver and the target. In this simplifying approximation, the receiver slant plane and the transmitter slant plane are practically coincident and both are practically coincident with the bistatic plane. It has therefore become a standard approximation of bistatic radar systems, that the motion of the transmitter and receiver lie within the bistatic plane. This approximate reduction of all system elements to a single plane greatly simplifies the analysis of bistatic radars. Unfortunately, the requirement that velocity vectors lie within the bistatic plane imposes significant constraints on the system and limits the operational flexibility.

A further limitation of conventional radar systems is that, in order to reach long ranges the beam must be narrow (i.e., the antenna gain must be high) so that the intensity of illumination falling on the target is sufficiently large for detection. This has led to a standard design approach whereby the narrowest illuminating and receiving beam is always considered the best.

In addition, when the ground is being illuminated from the air, long range observations result in a very shallow angle of illumination. The footprint of illumination is therefore spread out in a very long and narrow ellipse. For long range observation the parts of the ellipse that are near illuminate territory which is typically not of interest. Thus, much of the energy in the beam is wasted because it does not reach distant targets.

In some cases, such as air search radar, the beam is deliberately broadened so as to detect the presence of targets within a substantially larger volume of space. But the penalty for such broadening is a significant reduction in detection range. Thus, beam broadening is only occasionally pursued—and then only for specialty radars.

One consequence of this conventional design philosophy is that only a very small slice of territory can be examined by the radar at any given time. In order to survey a large range of territory the narrow beam is usually swept through an arc. As a result of this beam sweeping technique, only a small fraction of the accessible territory will be observed at any given time. Events in the un-illuminated territory are unobservable.

Bistatic radar consists of a separate transmitter and receiver. In normal ground observing bistatic radars, both the transmitter's illumination and the receiver's direction of observation are usually at a very shallow angle to the surface of the Earth. The intersection of the two beams is usually a very small patch because the angle of intersection of the two beams is usually substantially large. If the target area of interest is small, this patch can be continuously observed and the signal to noise ratio of the observation can be satisfactory out to a substantial range. However, since in general, both the transmitter and receiver are moving with respect to the target, special coordination between the illumination beam, receiver observation beams and the directions to the target must take place. This introduces a beam coordination problem known as the Scan-On-Scan beam coordination problem.

In the Scan-On-Scan operational mode a conventional bistatic radar illuminates a small region with a very narrow beam. When the transmitter beam moves, the receiver beam must move in a coordinated way to track the transmitter beam and follow a single target or small patch of territory. Alternatively, with Scan-On-Scan operation, the receiver beam can be fixed. In this case only a small area of territory is observed during the transmitter scan. Similarly, when the receiver beam scans, only a small area of territory is observed during each instant of the receiver scan.

Figures 1A, 1B, 2:
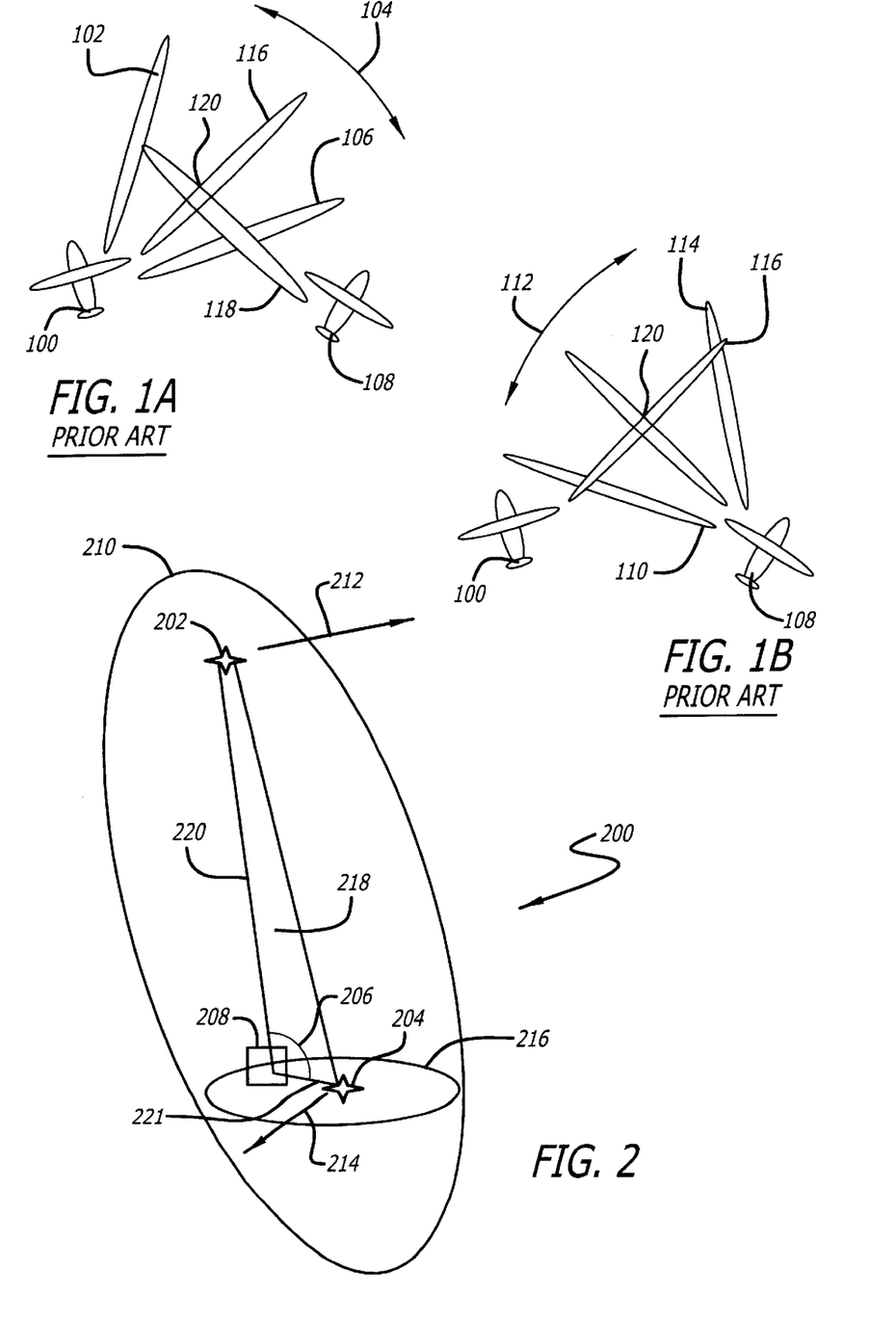
FIG. 1A is a conventional bistatic radar system performing Scan-on-Scan operations, with transmitter scanning highlighted.
FIG. 1B is a conventional bistatic radar system performing Scan-on-Scan operations, with receiver scanning highlighted.
FIG. 2 is a system diagram of a bistatic radar system implemented in accordance with the teachings of the present invention.

FIG. 1A displays a Scan-on-Scan operation, including a transmitter and receiver. FIG. 1A highlights the transmitter scan operation. FIG. 1B displays a Scan-on-Scan operation, including the transmitter and receiver shown in FIG. 1A. FIG. 1B highlights the receiver scan operation. Both FIG. 1A and FIG. 1B display a transmitter beam overlapping a receiver beam (e.g., item 120). In FIG. 1A a transmitter 100 generates a narrow transmitter beam in a first position 102 and then scans through an angle depicted by 104 to a second position 106. A receiver 108 is also shown generating a very narrow beam 118. The transmitter 100 and the receiver 108 are also shown in FIG. 1B. In FIG. 1B the receiver 108 generates a narrow beam 110 in a first position and scans through an angle depicted by 112 to a second position shown by 114. During the respective scanning operations, the beam from the transmitter 116, overlaps with the beam from the receiver 118, in a very narrow overlapping region 120 as shown in both FIGS. 1A and 1B. The very narrow overlapping region 120, is the observable target region of the system.

As shown in FIGS. 1A and 1B, if a bistatic radar is to be used to observe a large territory, the transmitter beam and the receiver beam must be separately scanned across the landscape. During these scans only a small fraction of the illuminating energy will find its way to the receiver at any given time. This means that for broad area observation, bistatic radars tend to be very energy inefficient.

When either the transmitter or the receiver is in motion, a bistatic radar system can create a high resolution two dimensional image of the landscape. (If the target is moving, but the transmitter and receiver remain stationary, a high resolution image of the target can similarly be constructed.) With motion of either the transmitter or the receiver the reflected signal will be Doppler frequency shifted as a function of relative motions and positions of the transmitter and receiver and the position of the target. In effect, the motions and positions of the transmitter and receiver paint the landscape with a spatial Doppler frequency gradient. If the transmitter and receiver are both moving in a similar direction the Doppler gradients add (in a vector sense) thereby creating a stronger Doppler gradient at the target. From the Doppler shift produced by this Doppler gradient it is possible to derive the azimuthal position of a given target object in the landscape. When this frequency gradient derived azimuth information, is combined with range information, which is derived from processing the radar's pulses, a high spatial resolution two-dimensional picture of the landscape can be formed. The technique creates a bistatic Synthetic Aperture Radar (SAR) which is closely akin to the widely used monostatic SAR.

While monostatic SAR radar systems are effective at producing high resolution images of a terrain, it is often difficult for them to extract images of moving targets located within the terrain. This is particularly true because the signals from moving targets spread out and therefore reduce in intensity relative to the terrain reflections. Such terrain dominant imagery is typically known as "image clutter" (e.g., clutter Doppler spectrum).

Bistatic radar provides an interesting and useful solution to the image clutter problem. When the motion of the receiver is in the opposite direction to that of the transmitter the Doppler spatial gradients cancel. This cancellation condenses the clutter Doppler spectrum into a narrowed frequency spectrum. The gradient cancellation is conventionally known as "clutter condensation." Characteristically, clutter condensation narrows the spectrum of the clutter but the Doppler offset of a moving target remains the same. With clutter condensation the returns from relatively slowly moving targets may therefore be found outside the clutter spectrum and may become highly observable. Thus, by suitably opposed motions of the transmitter and receiver, a bistatic radar system can become much more effective at detecting slowly moving targets than an equivalent monostatic radar wherein slow moving targets are lost in clutter.

In a typical conventional bistatic radar system clutter condensation operation, the transmitter aircraft and the receiver aircraft circle the target so that the two aircraft are always on opposite sides of the circle and the target is in the middle. In addition, both aircraft have to proceed in the same angular direction at the same angular velocity (for example, both are moving clockwise). Once this constrained geometry is maintained then clutter cancellation will take place in a small region around the target.

In conventional bistatic radar, the bistatic plane is (nearly) parallel to the Earth's surface. In addition, the transmitter and receiver motions effectively lie within the bistatic plan. These geometrical constraints significantly limit the conditions where clutter condensation is effective in isolating slowly moving targets.

Thus, there is a need in the art for a bistatic radar system which is capable of greater operational flexibility. In addition, there is a need for a radar system capable of discriminating targets in the presence of image clutter.

SUMMARY OF THE INVENTION

The need in art is addressed by the bistatic radar architecture of the present invention. In an illustrative embodiment, a bistatic radar system is disclosed in which a bistatic radar receiver is located in a first plane and a transmitter is located in a second plane. The first plane, or receiver slant plane, is different from the second plane or transmitter slant plane. The transmitter is located in Middle Earth Orbit (MEO). The transmitter plane is located at a position that is substantially tilted toward the vertical with respect to the first plane. As a result of this configuration, greater operational flexibility to fly various paths and trajectories is provided, which facilitates enhanced detection of targets.

In an illustrative embodiment, the instantaneous illumination from the transmitter is spread over a relatively large area of the Earth compared with the area of instantaneous illumination from conventional scanning radar systems. Because the illuminated region is broad the transmitting antenna can be physically small. For a transmitter onboard a MEO satellite, the transmitting antenna need only be a few meters in diameter. This relatively compact antenna results in substantial cost savings compared with conventional radar satellite designs.

A major benefit of instantaneously illuminating a substantially large area of the Earth is that many different receivers can simultaneously observe reflected signals from different parts of the illuminated region. These observations can be made independently or, they can be coordinated, either incoherently or coherently. Coherent observation is possible because all the participating receivers see the same coherent illumination. Thus, receivers can be connected together to make physically very large phased antenna arrays.

In the present invention, several embodiments are disclosed. In each embodiment, the transmitter and receiver are normally located in different slant planes, although in some cases the receiver and transmitter slant planes may be coincident. In one embodiment, the transmitter moves in a first direction and the receiver moves in a second direction which is opposite from (that is, anti-parallel to) the first direction. In a second embodiment, the transmitter moves in a first direction and the receiver moves in the same direction (that is, the transmitter and the receiver move parallel to each other). In a third embodiment, the transmitter moves in a first direction and the receiver moves in a second direction, which is neither parallel to, nor anti-parallel to the first direction. In a fourth embodiment, the transmitter moves in a first direction and the receiver is stationary. In a fifth embodiment, the transmitter sweeps an illuminated area with a narrow beam.

In the method and apparatus of the present invention a bistatic radar systems clutter condensation solution is presented, in which a transmitter aircraft and a receiver aircraft circle a target, on the same side of the target. Their motion is opposed—but not necessarily circular. This geometry enables practical clutter cancellation over broad sweeps of territory.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 2 is an illustrative embodiment of a bistatic radar architecture 200 implemented in accordance with the teachings of the present invention. In FIG. 2, a transmitter 202 and a receiver 204 are shown. In the illustrative embodiment, the transmitter 202 is located at Middle Earth Orbit (MEO); however, the transmitter may be located anywhere between Lower Earth Orbit (LEO) and Geo-synchronous Orbit (GEO). In the present embodiment, the selection of useful orbits depends on (approximately) matching the velocity-to-range ratio ($V_T/R_T$) of the satellite transmitter, wherein $V_T$ is the velocity of transmitter 202 (as depicted by velocity vector 212) and $R_T$ is the range (as depicted by line segment 220) of transmitter 202 to target 208, to the velocity-to-range ratio ($V_R/R_R$) of the receiver 204, wherein $V_R$ is the velocity of receiver 204 (as depicted by velocity vector 214) and $R_R$ is the range (as depicted by line segment 221) of receiver 204 to target 208. An exact match of thse ratios is seldom required for useful system architectures. Typically, a MEO orbital altitude above the Earth's surface of between 5000 km and 10,000 km is considered useful, with 7000 km being near optimum.

The Mid Earth Orbits (MEOs) allow satellites to dwell above the horizon for a significant amount of time. The useful ratio of dwell times can be as long as ten times that of Lower Earth Orbits. The result is that MEO constellations can provide continuous coverage of a given region with very few satellites. Second, MEO orbits have relatively good velocity-to-range ratio matches with aircraft mounted receivers. Third, satellites in MEO orbits typically dwell for relatively long periods at high angles above the horizon. Thus, MEO satellites, on average, have favorable observation geometries. A secondary benefit of these higher angles is that the transmitting antenna can be relatively small and still provide the desired area illumination. Fourth, during each orbit, MEO satellites dwell in the sun for much longer periods of time. This results in a longer solar illumination duty cycle that significantly reduces the power demand and therefore the cost of the satellite.

The transmitter 202 is in communication with a receiver 204 located on the Earth or near the Earth's surface relative to the transmitter 202. In the preferred embodiment, the transmitter 202 and the receiver 204 sit in the conjugate foci of a substantially elevated isorange ellipsoid 210.

A target 208 is also shown in FIG. 2. In one embodiment of the present invention, both the receiver 204 and the target 208 sit on a nearly horizontal plane 216 defined by the target, the receiver and the receiver's motion (e.g. velocity vector 214). The plane 216 is nearly parallel to the Earth is surface. Movement of the transmitter 202 is illustrated by a velocity vector 212 and movement of the receiver 204 is represented by a velocity vector 214. Horizontal plane 216 is the receiver slant plane and the plane defined by the transmitter 202, the target 208 and the motion of the transmitter velocity vector 212, is the transmitter slant plane. In the present invention, the transmitter slant plane and the receiver slant plane are non-coincident as shown in FIG. 2.

In the illustrative embodiment, the transmitter 202 is positioned substantially outside the nearly horizontal plane 216 as shown by angle 206. That is, angle 206 should be between approximately 10 degrees and 90 degrees, and preferably should be greater than 25 degrees. It should be appreciated that although the nearly horizontal plane 216 is characterized as nearly parallel to the surface of the Earth, and the transmitter is characterized as being substantially outside this plane, it is possible to vary the relationship of the target 208 relative to the receiver 204 without departing from the scope of the present teachings. In addition, it is possible to vary the angle 206 over a large range of angles (typically from 10 degrees to 90 degrees) and still remain within the scope of the present teachings. As already noted, an arrangement by which the plane formed by the receiver 204, the receiver's motion vector 214, and the target 208 is not precisely parallel with the Earth, is nonetheless within the scope of the present invention.

It should also be appreciated that the target 208, may also be located above a plane, which is nearly parallel to the Earth, on which receiver 204 is located or located below such a plane on which receiver 204 is located without departing from the scope of the present teachings. In addition, the receiver 204 may be fixed on the surface of the Earth so that the receiver's plane is the tangent plane of the Earth's surface, moving on the Earth, located on an airborne platform in a fixed position relative to the transmitter 202 or moving on an airborne platform relative to transmitter 202 without departing from the scope of the invention. The bistatic plane slicing through the ellipsoid 210 is shown as 218.

Figure 3A:
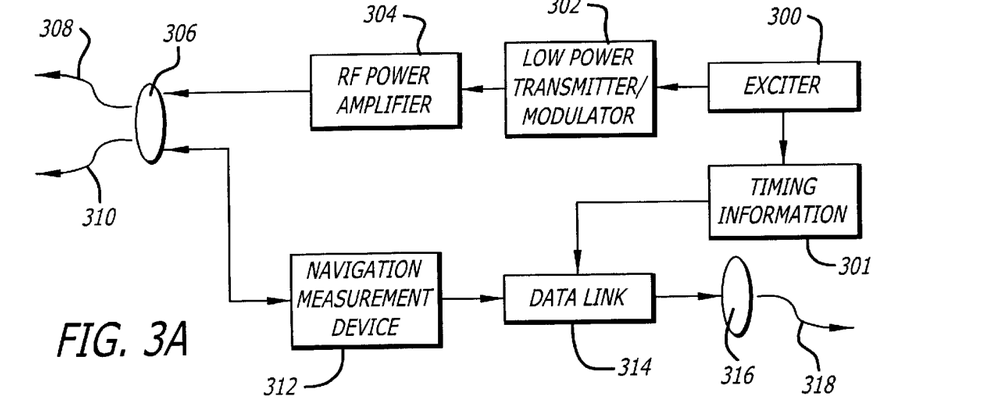
FIG. 3A is a block diagram of a transmitter implemented in accordance with the teachings of the present invention.
Figure 3B:
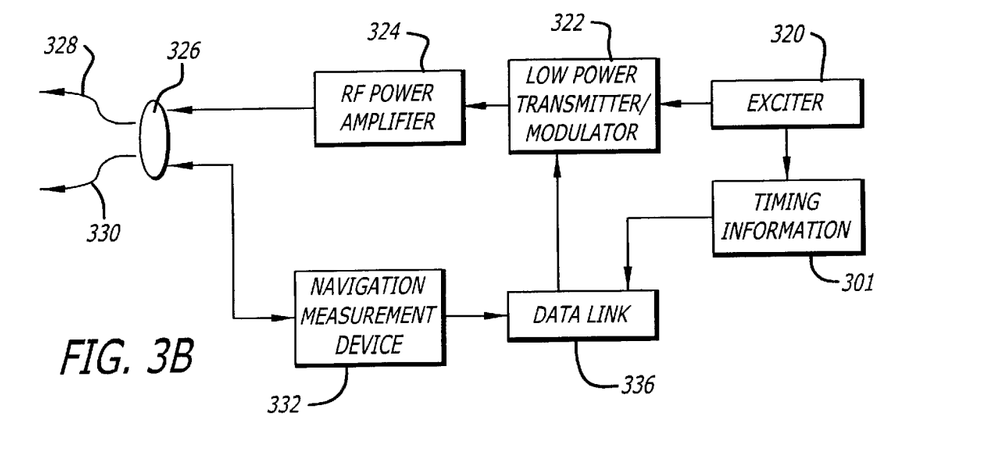
FIG. 3B is a block diagram of a first alternate embodiment of a transmitter, implemented in accordance with the teachings of the present invention.
Figure 3C:
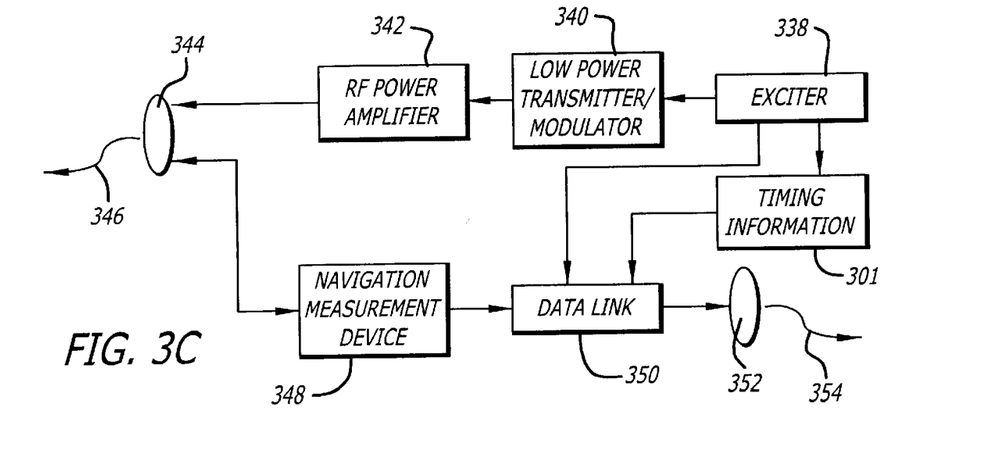
FIG. 3C is a block diagram of a second alternate embodiment of a transmitter, implemented in accordance with the teachings of the present invention.

FIGS. 3A, B, C are block diagrams of illustrative embodiments of a transmitter architecture implemented in accordance with the teachings of the present invention. The transmitter or space borne illuminator performs three functions: (1) illumination of the ground/target, (2) transmission of a direct path signal to a bistatic receiver to ensure coherent transmit/receive operation, (3) transmission of coordination data to one, or more, receivers referred to hereafter as "the receiver", which give critical status information about the location and condition of the transmitter. The transmitter generates at least two signals to accomplish these objectives: an illuminating signal, which is directed to the terrain/target and illuminates the terrain/target and which may also be directed to the receiver to provide coherent transmit/receiver operations; and a second signal, a data link, which is directed to the receiver and provides the necessary geometric information, so that the receiver can properly interpret the signals that are reflected from the landscape and the signals that provide coherent transmit/receiver operations.

In the preferred configuration, FIG. 3A, it is assumed that the signal transmitted from the main antenna will serve both to provide general illumination of the terrain as shown by 308 and also to provide the direct path signal as shown by 310, for coherent transmit/receive operations.

A direct path signal 310 is generated by an exciter 300 of conventional design. The exciter 300 provides timing information and key coordinate information to the Timing Information 301 that communicates directly to a Data Link 314. A data link path signal 318 is then communicated through a data link path antenna 316. The exciter 300 provides frequency stable pilot signals to the low power transmitter/modulator section 302 and also controls any modulation of the transmitted illumination. The low power signals from the transmitter/modulator are then amplified by the Radio Frequency (RF) Power Amplifier 304 and the resulting higher power signals are delivered to the antenna 306 for illumination of a target region. In the preferred configuration it is assumed that the direct path coherence reference signal will be supplied to the receiver by the main beam illumination.

The configurations shown also have a Navigation Measurement Device 312. The purpose of this device is to accurately determine, relative to the Earth, the location of the antenna's phase center. It also must determine, with adequate precision, the pointing direction of the antenna relative to the Earth. In so doing the navigation measurement device also is tasked to control the pointing of the antenna so as to insure that the main beam illumination falls on the desired area of the Earth. The navigation measurement device can make use of Global Positioning Satellite (GPS) data as well as Inertial Measurement Unit (IMU) data derived from an IMU located on the antenna. The antenna phase center information is communicated to a Data Link 314. A data link path signal 318 is then communicated through a data link path antenna 316.

In one embodiment, the transmitting antenna may be a circular aperture of two meters in diameter. Given practical limitations in the antenna's accuracy of shape, a two meter antenna operating at x-band produces a Gaussian distribution on the ground with a Gaussian sigma value of approximately 55 to 60 km when the satellite is nearly directly overhead. However, it should be noted that the transmitter element is not limited to an antenna of two meters in diameter. Other antenna sizes, particularly larger antennas, have significant utility.

In a second embodiment, FIG. 3B, the data link is provided by the main illumination of the transmitter. A separate data link is therefore not required. In this configuration the data link is used to control a sub channel modulation of the main illumination provided by the transmitter. An exciter 320 provides frequency stable pilot signals to the low power transmitter/modulator section 322 and also controls any modulations that are to be imposed on the transmitted illumination. The low power signals are then amplified by the Radio Frequency (RF) Power Amplifier 324 and the resulting higher power signals are delivered to the antenna 326 for illumination of the target region. The signal transmitted from the antenna 326 provides general illumination of the terrain as shown by 328 and also provides direct path signal as shown by 330. Navigation Measurement Device 332 provides information to a Data Link 336. The Data Link 336 is fed back into the low power transmitter/modulator 322.

A third configuration, 3C, sends the coherence information to the receiver over a separate data link path. In this configuration the separate data link provides both geometric information and coherence information to the receiver. An exciter 338 provides frequency stable pilot signals to the low power transmitter/modulator section 340. The low power signals are then amplified by the Radio Frequency (RF) Power Amplifier 342 and the resulting higher power signals are delivered to the antenna 344 for illumination of the target region. A Navigation Measurement Device 348 provides information to a Data Link 350. The Data Link 350 also receives input from the exciter 338. As a result, the Data Link 350 generates a data link path signal with supplementary direct path information 354 through antenna 352.

In one embodiment of the present invention, the transmitter is placed at approximately 7000 kilometers. In essentially all cases, a satellite carrying the transmitter is not directly overhead but off to the side at some distance. For satisfactory coverage of an area on the surface of the Earth (e.g., an illuminated area), a number of satellites and a number of orbital planes should be deployed. In the present embodiment at least three orbital planes are utilized. However, it should be appreciated that the number of orbital planes will change depending on the mission and missions objectives.

Figure 4A:
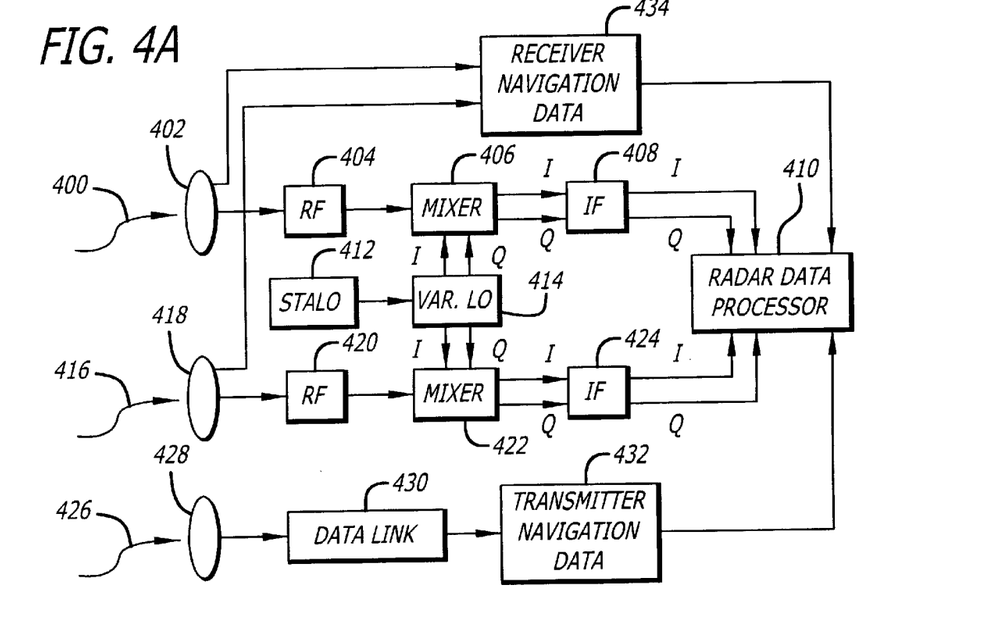
FIG. 4A is a block diagram of a receiver implemented in accordance with the teachings of the present invention.
Figure 4B:
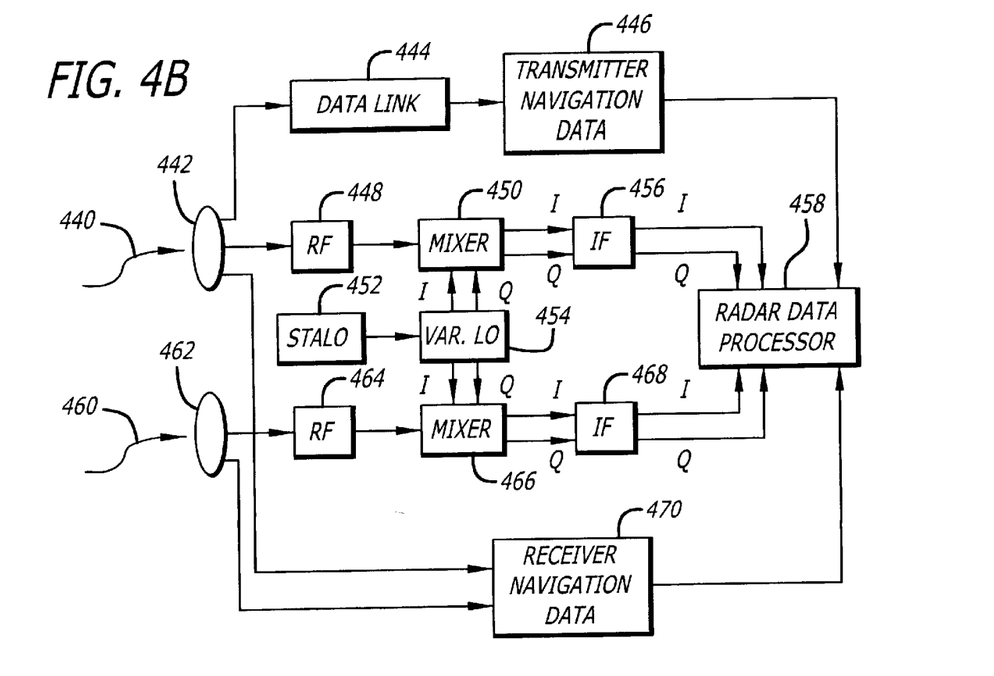
FIG. 4B is a block diagram of an alternate embodiment of a receiver, implemented in accordance with the teachings of the present invention.

FIGS. 4A and 4B are block diagrams of the receiver implemented in accordance with the teachings of the present invention. For illustration purposes these receivers are shown as single conversion heterodyne receivers. Multiple conversion receivers, such as double and triple conversion receivers, are also possible and should be considered within the scope of this invention. The bistatic receiver contains two channels, an upper channel and a lower channel. The upper channel is employed to receive the direct signal generated by the transmitter and the lower channel is employed to receive a signal reflected from the terrain/target (e.g., reflected signal). Both the direct signal and the reflected signal are down converted into video signals and recorded in a signal data processor. Coherent operation is achieved with a master oscillator signal from the transmitter. In the best mode, the direct signal phase is offset relative to the reflected signal phase.

The receiver configuration of FIG. 4A corresponds to the transmitter configuration of FIG. 3A. In FIG. 4A the direct signal 400 from a transmitter is received by a direct path antenna 402. The direct path antenna 402 inputs the direct signal 400 into a conventional radio frequency (RF) stage 404. The RF stage 404 may amplify the direct path signal and pass it to a mixer 406 for frequency down conversion. The mixer also receives the in-phase (I) and quadrature (Q) output from a variable local oscillator (Var. LO) 414. The variable local oscillator converts the direct path RF signal to a set of Intermediate Frequencies (IF) as shown by 408, which are easier to process and interpret. The IF path consists of two parallel paths, one for the in-phase signal and the other for the quadrature signal. Early synthetic aperture radar receivers used analog optical recording for processing the down-converted IF signals. Digital processing is the currently preferred technique. Both analog and digital processing are within the scope of this invention, but digital signal processing is the preferred embodiment. With digital signal processing, the frequency down conversion must produce signals in a frequency range such that the signals will meet the Nyquist sampling criterion while being passed through an analog-to-digital (A/D) converter. The A/D converter can be considered an input stage of the Radar Data Processor 410. The output from the A/D converter is then passed into the memory of the Radar Data Processor 410 for Image Formation, interpretation and display.

The Variable Local Oscillator (Var. LO) 414 is controlled by a Stable Local Oscillator (STALO) 412. The STALO 412 provides a very stable signal that can act as a phase reference over an extended period of time. The variable local oscillator typically synthesizes a variable frequency signal using timing and pilot oscillations established by the STALO 412.

In FIG. 4A a second analog receiver chain receives a reflected path illumination signal 416 through a Reflected Path Antenna 418. This receiver is similar to the direct path receiver chain, but may have significantly different gating and gain control settings because the reflected path signal arrives at a different time than the direct path signal and is a much weaker signal. A reflected path antenna 418 inputs the reflected path illumination signal 416 into a conventional radio frequency (RF) stage 420. The RF stage 420 may amplify the direct path signal and pass it to a mixer 422 for frequency down conversion. The mixer 422 also receives the in-phase (I) and quadrature (Q) output from a variable local oscillator (Var. LO) 414. The IF stage 424 output from the reflected path receiver is also passed to the Radar Data Processor 410 where it is converted into digital signals and further processed.

In the Radar Data Processor the direct path signal serves as a phase reference, which assists in the coherent image formation of the reflected path signals. Also assisting in the coherent image formation is information about the relative positions and orientations of the transmitter, the receiver and the target. In FIG. 4A a Data Link Signal 426, which carries the information about the transmitter's location, velocity and antenna phase center, together with timing information, are passed to the receiver through a separate antenna 428 and Data Link decoder 430. This serves as an input to the Transmitter Navigation Data stage shown as 432.

In bistatic radar the Radar Data Processor 410 also needs to know the geometric condition (location and movement) of the receiver, including any motions of the phase center of the antennas. This information, in the form of Receiver Navigation Data, shown as 434, can be derived by a combination of Global Positioning System (GPS) measurements, together with an Inertial Navigation System (INS) device and an Inertial Measurement Unit (IMU) device. The INS, together with GPS, tells where the receiver is, at any given time, and what its general motion is. The IMU tells how the antenna phase center is changing with respect to the INS location.

FIG. 4B shows an alternative receiver configuration which corresponds to the transmitter configurations of FIGS. 3B and 3C. This receiver is similar to that of FIG. 4A except that the Transmitter Navigation Data is received from the direct path antenna. In this embodiment the transmitter navigation data can either be modulated onto the main radar signal, or it can be transmitted on a separate communications channel.

In the illustrative embodiments, there is also a data link channel. This channel retrieves the transmitted navigation information about the transmitter's location, and other key status information. The two receiver embodiments differ primarily in how the data link is implemented. In the configuration shown in FIG. 4A there is a separate data link which carries this information. In configuration shown in FIG. 4B the data link information is received through the direct path channel. In FIG. 4B the navigation data stream might be modulated onto the main signal, corresponding to transmitter configuration 3B. Alternatively, the navigation data stream might be carried on an independent (e.g., different frequency) channel. This alternative corresponds to transmitter configurations 3A and 3C.

The illustrated receiver configurations are adaptations of common modern practice in many types of airborne and ground based radars. These radars are required to make precise angle measurement, of stationary or moving targets, within relatively short times. To achieve this the receiver antenna is divided into two side-by-side segments that deliver signals to a combiner that produces sum and difference channels. The receiver consists of two separate receivers, one for the sum channel and one for the difference channel. The division of the receiver into two segments (e.g., the upper channel that receives the direct path signal and the lower channel which receives the reflected signal) allows for the received signals to be summed in phase or subtracted from one another. This configuration provides accurate angular location of the reflected signal. In addition, the receiving antenna has the ability to sweep horizontally back and forth to observe different parts of the illuminated region.

This modern practice, also known as "monopulse radar", is also possible with the receivers specified by this invention. Direct path and data link signals 440 are input into a direct path antenna 442. The direct path signals 440 are processed through an RF stage 448, a mixer 450 and an IF stage 456. Data processing is performed by Radar Data Processor 458. The direct path signal 440 also feeds the data link 444 and the transmitter navigation system 446. The reflected path illumination 460 is input into a reflected path antenna 462 and processed through RF 464, mixer 466 and an IF stage 468. The orientation of the antenna 462 and antenna 442 are also input into receiver navigation data 470. The reflected path receiver, illustrated by antenna 462, RF and IF amplifiers 464 and 468, and Local Oscillators 452 and 454 may be replicated into two coherently linked sum and difference channels according to the modern practice described above. The local oscillators of these sum and difference receivers would be common. Thus, local oscillators 452 and 454 would be shared with the sum and difference reflected path receivers and with the direct path receiver.

In one embodiment of the present invention, a receiver may be mounted on an aircraft at a distance from the center of an illuminated region. It is assumed that the aircraft can fly around the periphery of the broadly illuminated area. It is also assumed that the aircraft can penetrate inside the region of illumination.

The following is illustrative of the performance that may be expected of a transmitter implemented in accordance with the teachings disclosed in FIGS. 3A, B, C and a receiver implemented in accordance with the teachings disclosed in FIGS. 4A, B.

The transmitter is assumed to be mounted on a MEO satellite at an orbital altitude of 7000 km above the surface of the Earth. For these calculations the satellite is nearly straight overhead, but is slightly displaced laterally so that the slant range from the transmitter to the target is 7250 km.

In the illustration, the transmitter/receiver combination operates at X-band with a wavelength ($\lambda$) of 3.2 cm. As mentioned previously, the transmitter illuminates an area on the ground with an intensity distribution that is approximately a circular Gaussian in shape. The profile of the illumination on the ground is approximately:

$$I(\rho) = I_0 \exp\left(-\frac{\rho^2}{2s^2}\right) \quad [1]$$

where the far field Gaussian sigma value is given by:

$$S = \frac{\sqrt{2}}{\pi} \frac{1}{\sqrt{Strehl}} \frac{\lambda}{D} R \quad [2]$$

where '$\lambda$' is the wavelength, 'D' is the circular aperture diameter, and 'R' is the range from the transmitter to the target. The Strehl ratio is the true peak intensity at the center of the illuminated region divided by the ideal diffraction limited peak intensity. Another definition of the Strehl ratio is the effective area of the antenna divided by the true geometric area of the antenna.

The peak intensity, $I_0$, is given by:

$$I_0 = \frac{W_T}{2\pi S^2} \quad [3]$$

where $W_T$ is the output power delivered by the transmitter.

Assuming that the range from the transmitter to the target 'R' is 7250 km, the wavelength $\lambda$ is 3.2 cm, the aperture diameter D is 2 meters, and the Strehl ratio is 0.75, then the Gaussian sigma value at the ground from equation [2] is:

$$S = \frac{\sqrt{2}}{\pi} \frac{1\lambda}{\sqrt{Strehl}\, D} R = \frac{\sqrt{2}}{\pi} \frac{1}{\sqrt{0.75}} \frac{0.032}{2} 7250 = 60.3 \text{ km} \quad [4]$$

The peak incident intensity onto the ground is given by equation [3]. If the average power output from the transmitter is 1500 watts, then:

$$I_0 = \frac{W_T}{2\pi S^2} = \frac{1500}{2\pi(60.3 \times 1000)^2} = 6.57 \times 10^{-8} \frac{\text{watt}}{\text{m}^2} \quad [5]$$

The incident intensity 50 km from the illumination center from equation [1] is:

$$I = I_0 \exp\left(-\frac{\rho^2}{2S^2}\right) = 6.57 \times 10^{-8} \exp\left(-\frac{50^2}{2 \times 60.3^2}\right) = 4.66 \times 10^{-8} \frac{\text{watt}}{\text{m}^2} \quad [6]$$

The following table summarizes the illumination at various radii from the illumination center:

TABLE 1

| $\rho$ (km) | $I_\rho$ (w/m$^2$) | Fraction |
|---|---|---|
| 0 | 6.57 × 10$^{-8}$ | 1 |
| 25 | 6.03 × 10$^{-8}$ | 0.918 |

TABLE 1-continued

| $\rho$ (km) | $I_\rho$ (w/m$^2$) | Fraction |
|---|---|---|
| 50 | 4.66 × 10$^{-8}$ | 0.709 |
| 75 | 3.03 × 10$^{-8}$ | 0.461 |
| 100 | 1.66 × 10$^{-8}$ | 0.253 |

As mentioned above, in the illustrative embodiment of the present invention, the assumed receiver antenna shown in FIG. 3 has an effective area of 0.34 m$^2$, with a receiver antenna width of 1.25 meters and a height of 0.36 meters. The nominal antenna area is 0.45 m$^2$. The Strehl ratio is the ratio of these two areas or Strehl=0.75.

The gain of a diffraction-limited antenna of this size, $A_R$, is given by:

$$G = 4\pi \frac{A_R}{\lambda^2} Strehl = 4\pi \frac{0.45 \text{ m}^2}{0.032^2 \text{ m}^2} 0.75 = 4142 \rightarrow 36.2 \text{ dB} \quad [7]$$

The effective gain of the antenna after the combiner is 34.3 dB. The difference between the two is 1.9 dB. The combiner loss is therefore 1.9 dB. To determine the effective dimension of the antenna we rescale the physical aperture dimensions by the square root of the Strehl ratio.

Thus, the effective antenna width is:

$$\text{Antenna Width} = 1.25 \text{ m} \times \sqrt{0.75} = 1.08 \text{ m} \quad [8]$$

The antenna height is:

$$\text{Antenna Height} = 1.36 \text{ m} \times \sqrt{0.75} = 1.32 \text{ m} \quad [9]$$

Receiver noise is assumed to be referenced to the aperture of the antenna (e.g. the noise is referenced to a virtual point ahead of the combiner). This means that the combiner loss drops out of the signal-to-noise ratio. The receiver noise figure is 1.8 dB, which works out to a loss factor of 1.51. The receiver temperature is 300 degrees Kelvin. With Boltzmann's constant value of k=1.38×10$^{-23}$ joules/Kelvin, a noise power per hertz of bandwidth B may be calculated, as follows:

$$W_N = kTFB = 1.38 \times 10^{-23} \times 300 \times 1.51 B = 6.25 \times 10^{-21} B \text{ watts/hz} \quad [10]$$

Since, for a Doppler radar, the illuminating signal is coherent, the noise bandwidth is the reciprocal of the total integration time '$\tau$'. Thus, equation [10] may also be written as:

$$W_N = \frac{kTF}{\tau} = \frac{1.38 \times 10^{-23} \times 300 \times 1.51}{\tau} = \frac{6.25 \times 10^{-21} \frac{\text{watts}}{\text{hz}}}{\tau} \quad [11]$$

If the receiver's beam sweeps over 60 degrees in 4 degree steps with a total sweep time of 60 seconds, then, the dwell time $\tau$ for each step is $\tau$=4 seconds. The bandwidth B is ¼ hz. The noise power is therefore:

$$W_N = \frac{kTF}{\tau} = \frac{1.38 \times 10^{-23} \times 300 \times 1.51}{4} = 1.56 \times 10^{-21} \text{ watts} \quad [12]$$

The reflected signal propagates to the receiving antenna and into the receiver. After recombination of the signals by the antenna segments, the effective signal power, referenced to the full aperture, $A_R$, of the receiving antenna, is:

$$W_s = \frac{I_\rho}{4\pi} \frac{A_R}{R^2} \frac{\sigma_x}{L_{path}} \quad [13]$$

where

| | |
|---|---|
| $I_\rho$ | is the intensity of the incident RF illumination of the terrain; |
| $\sigma_x$ | is the target cross section, assumed here to be 1 square meter; |
| R | is the range from the target to the receiver; and |
| $L_{path}$ | is the path loss sustained by the reflected wavefront. |

Since the noise is referenced to the antenna aperture, the path loss is equal to the atmospheric transmission loss. For ranges up to 200 km, this loss is assumed to be 1 dB, or less. Thus, if we take the loss as 1 dB, $L_{path}$=1.26.

As equation [13] indicates, the signal strength depends on both the illumination intensity at the target and on the range from the target to the receiver. The illumination is not, in general, uniform. As described earlier, a diffraction-limited circular aperture (e.g., transmitting antenna) will have a far field pattern (e.g., illuminated region) whose central lobe can be well approximated by the Gaussian function.

The center of the Gaussian distribution, is the brightest point. Illumination diminishes with movement from the center of the Gaussian distribution toward the edges in any direction, until you get to a point that is considered the limit of practical observability. For the example system modeled by the foregoing calculations, this limit is about 175 km from an observer.

In general terms, the range to the limit of practical observability will be a function of the receiver design and the size of the receiving antenna. Receivers with large antennas will be able to reach out further than receivers with small antennas.

Given the Gaussian distribution, a point that is farther away and has a lower intensity will have a smaller signal-to-noise ratio than a point that is closer and has a higher intensity. For example, a point at the limit of practical observability will have a smaller signal-to-noise ratio than a point at the center of the Gaussian distribution (e.g., the brightest point). The reduction in illumination intensity in the range factor will combine to establish the practical limit of sweep angle for the receiver.

An example of the signal-to-noise ratio (SNR) should demonstrate this concept. The signal-to-noise ratio for a point at the limit of practical observability (e.g., 175 km) from an observer, which is also 50 km from the center of illumination, may be shown as follows. As shown in Table 1, the intensity of illumination is 4.66×10−8 watts/m². Using equation [13] with a target cross-section area of 1 square meter, the received signal power may be calculated as follows:

$$W_s = \frac{I_\rho A_R \sigma_x}{4\pi R^2 L_{path}} = \frac{4.66 \times 10^{-8} \times 0.34 \times 1}{4\pi 175,000^2 \times 1.26} = 3.27 \times 10^{-20} \text{ watts} \quad [14]$$

For a 4 second integration and a 60 second total sweep time, according to equation in [14], the noise power is 1.56×10⁻²¹ watts. The signal-to-noise ratio for the limit of practical observability (e.g., 175 km) is therefore:

$$SNR_G = \frac{W_S}{W_N} = \frac{3.27 \times 10^{-20}}{1.56 \times 10^{-21}} = 20.96 \rightarrow 13.2 \text{ dB} \quad [15]$$

Similar signal to noise calculations may also be performed for range that are 145 km from an observer and 30 degrees off the longitudinal axis or a range that is 75 km from an observer. These calculations produce signal-to-noise ratios that are 14.2 dB and 20.6 dB respectively. This demonstrates that the signal-to-noise ratio varies with movement across the Gaussian distribution from a center point to the outer region of the distribution.

Figures 5, 6, 7:
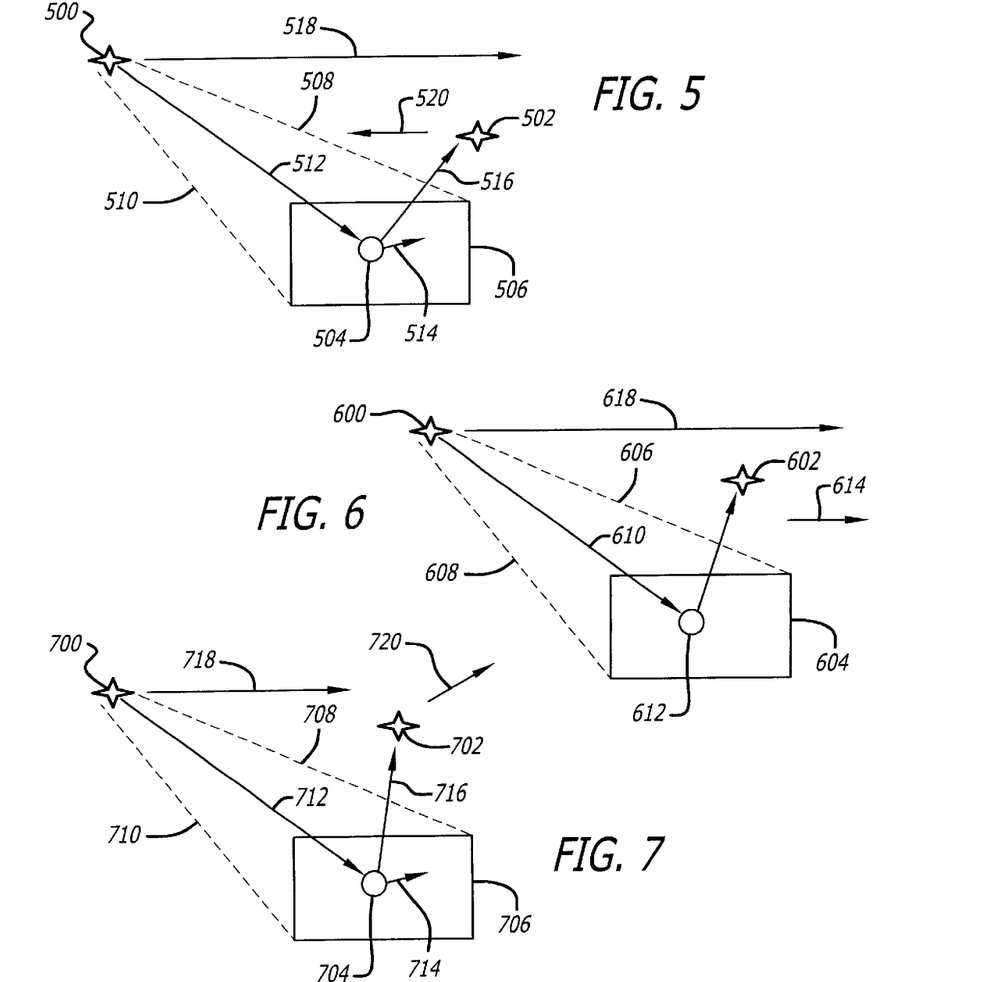
FIG. 5 illustrates a Ground Moving Target Indication (GMTI) application mode of the system and method of the present invention.
FIG. 6 illustrates a Synthetic Aperture Radar (SAR) application mode of the system and method of the present invention.
FIG. 7 illustrates a mixed SAR/GMTI application mode of the system and method of the present invention.

FIG. 5 illustrates a Ground Moving Target Indication (GMTI) application of the present invention. In FIG. 5 a transmitter 500 moves in a direction denoted by a transmitter velocity vector 518. The transmitter creates an illuminated region 506 defined by demarcation lines 508 and 510. A receiver 502 moves in a direction denoted by receiver velocity vector 520, which is opposite or nearly opposite to the transmitter velocity vector 518. A slowly moving target 504 is located within the illuminated region 506. The motion of the slowly moving target is denoted by target velocity vector 514.

In GMTI mode, there is a partial or full cancellation of the Doppler gradient, since the transmitter velocity vector 518 is moving in the opposite direction to the receiver velocity vector 520. The transmitter's motion creates a pattern of Doppler shifts painting the illuminated region 506. The receiver's motion creates a countervailing Doppler pattern that partially or fully, cancels the transmitters Doppler pattern. As a result, the clutter line width (e.g., frequency of signals that are reflected from the terrain) is substantially narrowed. Therefore, the Doppler shifted signal from a slowly moving target may lie outside the width of the clutter line even if the target is moving slowly. This allows such a slowly moving target 504 to be easily extracted from the clutter background.

FIG. 6 illustrates a Synthetic Aperture Radar (SAR) application of the present invention. In FIG. 6 a transmitter 600 moves in a direction denoted by a transmitter velocity vector 618. The transmitter creates an illuminated region 604 defined by demarcation lines 606 and 608. A receiver 602 moves in a direction denoted by receiver velocity vector 614, which is in the same direction as transmitter velocity vector 618. A target 612 is located within the illuminated region 604.

In SAR mode the transmitter 600 and the receiver 602 are moving in the same or nearly same direction as shown by transmitter velocity vector 618 and receiver velocity vector 614. As a result, the Doppler gradient generated by the transmitter motion and the Doppler gradient generated by the receiver motion add to create nearly double the Doppler gradient. This increased Doppler gradient enhances the spatial resolution when the system is used to create a synthetic aperture antenna though Doppler analysis of the reflected signal. As a result, the target 612 is easily detected.

FIG. 7 displays a mixed SAR/GMTI application of the present invention. In FIG. 7 a transmitter 700 moves in a direction denoted by a transmitter velocity vector 718. The transmitter creates an illuminated region 706 defined by demarcation lines 708 and 710. A receiver 702 moves in a direction denoted by receiver velocity vector 720. A target 704 is located within the illuminated region 706 and moves in a direction denoted by the target velocity vector 714.

In the mixed SAR/GMTI mode the receiver 702 is moving as denoted by receiver velocity vector 720. As a result, the clutter spectrum is narrowed, but there is also a fairly high lateral spatial resolution. In the mixed mode the receiver is typically moving in a diagonal direction with respect to the direction of the motion of the transmitter. The Doppler shift patterns generated by the transmitter and the receiver only partially cancel each other. This enables simultaneous medium precision measurements in both the SAR and GMTI modes.

Figure 8:
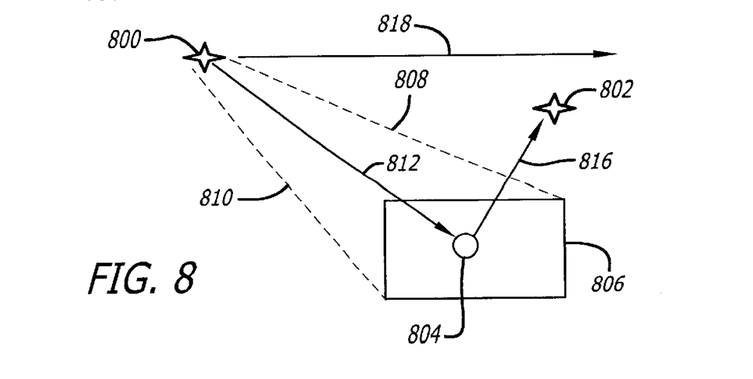
FIG. 8 is illustrative of an application of the system and method of the present invention including a fixed receiver.

FIG. 8 displays a stationary receiver application of the present invention. In FIG. 8 a transmitter 800 moves in a direction denoted by a transmitter velocity vector 818. The transmitter creates an illuminated region 806 defined by demarcation lines 808 and 810. A receiver 802 that is stationary is shown. A target 804 is located within the illuminated region 806.

In the stationary receiver application, the transmitter 800 is moving in a direction denoted by transmitter vector 818. The receiver 802 can generate high resolution pictures of its surroundings because the transmitter is moving and illuminates the landscape with spatially varying Doppler signals.

Figure 9:
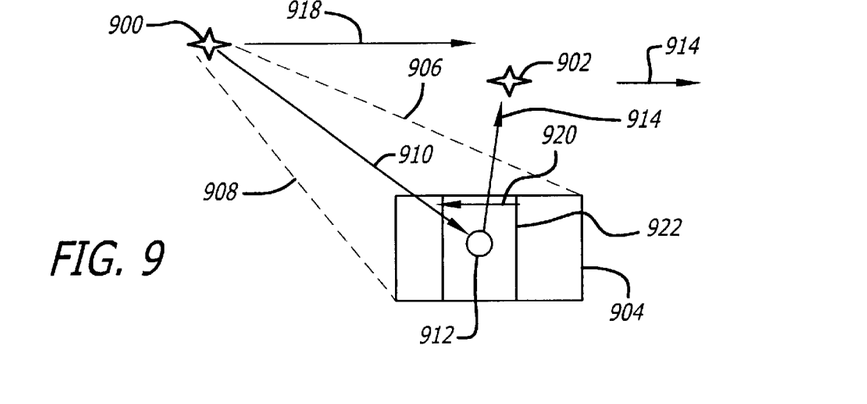
FIG. 9 illustrates a GMTI sweep application mode of the system and method of the present invention.

FIG. 9 illustrates an SAR/GMTI sweep mode application of the present invention with a moving receiver. In FIG. 9 a transmitter 900 moves in a direction denoted by a transmitter velocity vector 918. The transmitter creates an illuminated region 904, which is defined by demarcation lines 906 and 908. A receiver 902 moves in a direction denoted by receiver velocity vector 914. It should be appreciated that in the SAR/GMTI sweep mode the receiver velocity vector may move in the same direction as the transmitter velocity vector, in an opposite direction to the transmitter velocity vector or in a direction that is in between the two directions. A target 912 is located within the illuminated region 904. A beam pattern 922 sweeps across the illuminated region 904 in a direction denoted by 920, or in the opposite direction.

In the SAR/GMTI sweep mode the transmitter 900 generates a narrowed beam pattern 922. The narrow beam pattern 922, repeatedly sweeps across the terrain within the illuminated region 904. In this mode, the receiving antenna is also synchronously swept across the terrain in such away as to observe the beam pattern 922. The beam pattern sweeps across the illuminated region 904 at a speed that is on the order of tens of seconds.

In the SAR/GMTI sweep mode, since the transmitter's beam has been narrowed, the intensity of illumination on the ground is increased. The result is that the receiving system will have a much greater signal-to-noise ratio (SNR). This increased SNR may be converted into an increased range or a relatively fast sweep across a large area of terrain.

Figure 10:
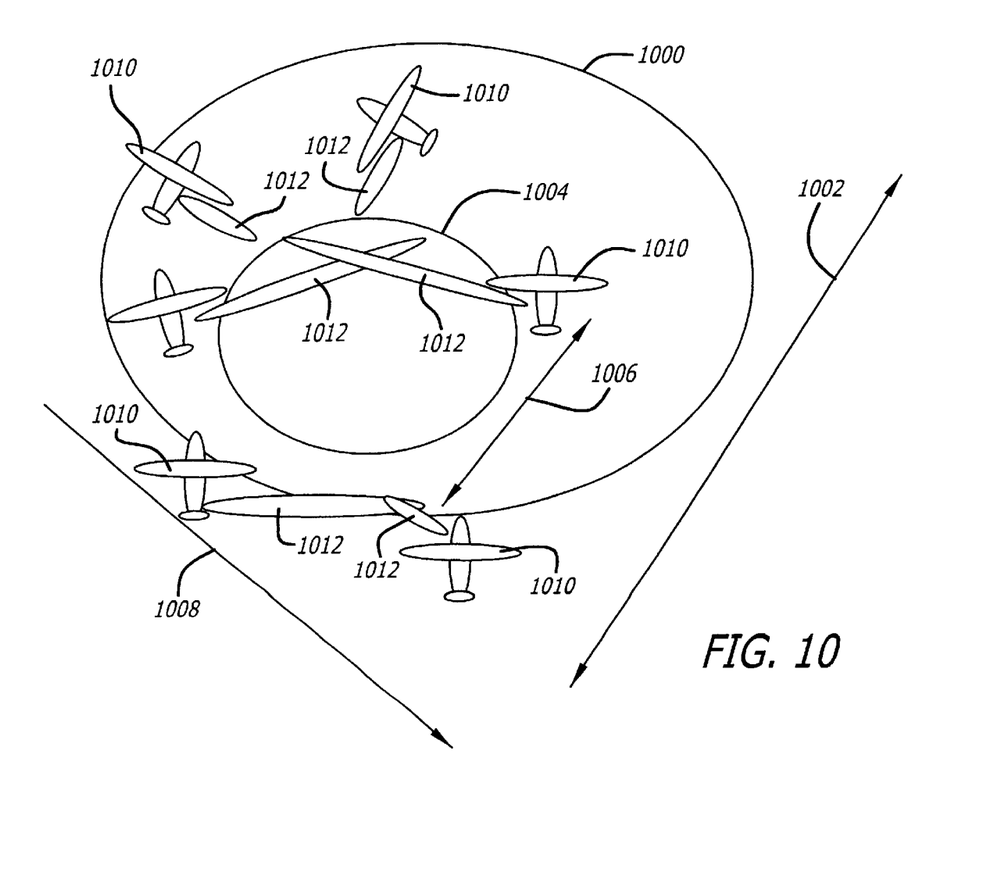
FIG. 10 illustrates a coordinated application of the system and method of the present invention highlighting a broad transmitter beam.

FIG. 10 illustrates a coordinated application of the system and method of the present invention highlighting a broad transmitter beam. In FIG. 10 the method and apparatus of the present invention are disclosed, in which a bistatic radar system uses broad area illumination beams and spot receiving. An area of lesser illumination intensity is shown as 1000. The area of lesser illumination intensity 1000 is generated by a transmitter (or transmitter constellation). In the present embodiment, the area of lesser illumination intensity 1000 may be 250 km in diameter as shown by 1002. An area of strongest illumination intensity 1004 is also shown. The area of strongest illumination intensity 1004 is located within the area of lesser illumination intensity 1000. The area of strongest illumination 1004 is the area that receives the strongest intensity signals from the transmitter. In the present embodiment, the area of strongest illumination intensity may be 100 km in diameter. Both areas of illumination intensity are generated by a transmitter moving along a trajectory as shown by 1008. A constellation of receivers 1010 generate antenna beam patterns 1012 and fly trajectories that are outside, within or transition through both the areas of illumination intensity 1000 and 1004. The constellation of receivers 1010, are able to simultaneously observe different parts of the illuminated area or alternatively, cooperatively observe a single target.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A bistatic system comprising:
   a bistatic transmitter for transmitting electromagnetic energy, said transmitter having a first velocity-to-range ratio relative to a target; and
   a bistatic receiver for receiving said electromagnetic energy reflected from said target, said receiver having a second velocity-to-range ratio relative to said target, wherein the velocity-to-range ratio of the receiver is approximately equal to the velocity-to-range ratio of the transmitter.

* * * * *